United States Patent [19]

Gateaud

[11] Patent Number: 5,018,675

[45] Date of Patent: May 28, 1991

[54] AUXILIARY WORKING BOWL FOR A FOOD PROCESSOR

[75] Inventor: André Gateaud, Perrecy les Forges, France

[73] Assignee: Robot Coupe S.A., France

[21] Appl. No.: 329,529

[22] Filed: Mar. 28, 1989

[30] Foreign Application Priority Data

Jul. 29, 1987 [FR] France ................................. 87 10725

[51] Int. Cl.$^5$ .............................................. B02C 18/12
[52] U.S. Cl. .................................................. 241/282.2
[58] Field of Search ................... 241/92, 282.1, 282.2, 241/199.12; 99/510, 511, 503

[56] References Cited

U.S. PATENT DOCUMENTS

| | | | |
|---|---|---|---|
| 4,194,697 | 3/1980 | Lembeck | 241/92 |
| 4,586,666 | 5/1986 | Fox | 241/282.2 |
| 4,702,162 | 10/1987 | Sontheimer et al. | 241/282.1 X |

FOREIGN PATENT DOCUMENTS

| | | |
|---|---|---|
| 2147361 | 3/1973 | France . |
| 2545712 | 11/1984 | France . |
| 2135569 | 9/1984 | United Kingdom . |

*Primary Examiner*—Mark Rosenbaum
*Attorney, Agent, or Firm*—Thomas A. O'Rourke

[57] ABSTRACT

An auxiliary working bowl for a food processor is mounted without a lid between the top of the sleeve (4) in the main bowl (1) and beneath the lid (2), with a tool (8) fixed to the drive shaft (5) rotating inside the auxiliary bowl (7).

9 Claims, 5 Drawing Sheets

AUXILIARY WORKING BOWL FOR A FOOD PROCESSOR

The present invention relates to an auxiliary working bowl for a food processor.

Such appliances are well known, in particular from French patent FR-A-2 147 361 (Verdun). In general, they comprise a base in which an electric motor is mounted whose shaft emerges vertically from the base, with various tools being mountable on said shaft inside a bowl which is removably fixed on the base and which includes lid-locking means at the top thereof.

Given the conditions of utilization, safety means are provided in the base. These safety means are enabled either via a push rod or else by means of a tab projecting radially out from the lid as a function of the structure of the base.

The inside volume of a food processor bowl is generally such as to correspond to the quantity of ingredients required for preparing a dish to feed a family of several people. Thus, the capacity of conventional bowls is about 1 liter to 2.5 liters. However, although this capacity is satisfactory for normal uses, it is not satisfactory when preparations of small volume are to be prepared, for example sauces or the like. For such small preparations, it is necessary to make use of another appliance.

Proposals have already been made to place an auxiliary receptacle in the main bowl on the central sleeve, in particular in FR-A-2 547 712 and in GB-A-2 135 569 which describes an auxiliary bowl disposed in the middle of the appliance beneath the central food-insertion hopper. It is closed by an independent lid which prevents ingredients from being inserted while the appliance is working. Unfortunately, such insertion is required for some preparations.

The object of the present invention is to remedy this drawback by making it possible to work on small quantities of food inside a relatively large bowl.

According to the present invention, the auxiliary working bowl for a food processor comprising a main bowl on which a lockable lid is removably mounted, the main bowl including a baffle-forming sleeve inside which the motor shaft passes, is characterized in that its diameter is smaller than the diameter of the main bowl, said auxiliary bowl being mounted by pressing on the top of the sleeve and against the bottom face of the lid of the main bowl.

It is thus possible to work in the top portion only of the main bowl using one or more auxiliary bowls which may be of different diameters but in which the distance between the center of the bottom of the bowl and its top edge remains constant, thereby enabling such auxiliary bowls, which need not have flat bottoms, to be used over a full range of appliances of different dimensions.

According to another characteristic of the invention, when the lid has a food-insertion hopper, the auxiliary bowl is characterized in that it has a projecting rim constraining the auxiliary bowl to rotate with the lid of the food processor.

Other characteristics and advantages of the present invention appear from the following description of a particular embodiment given purely by way of non-limiting example and with reference to the accompanying drawings in which.

Figure 1:
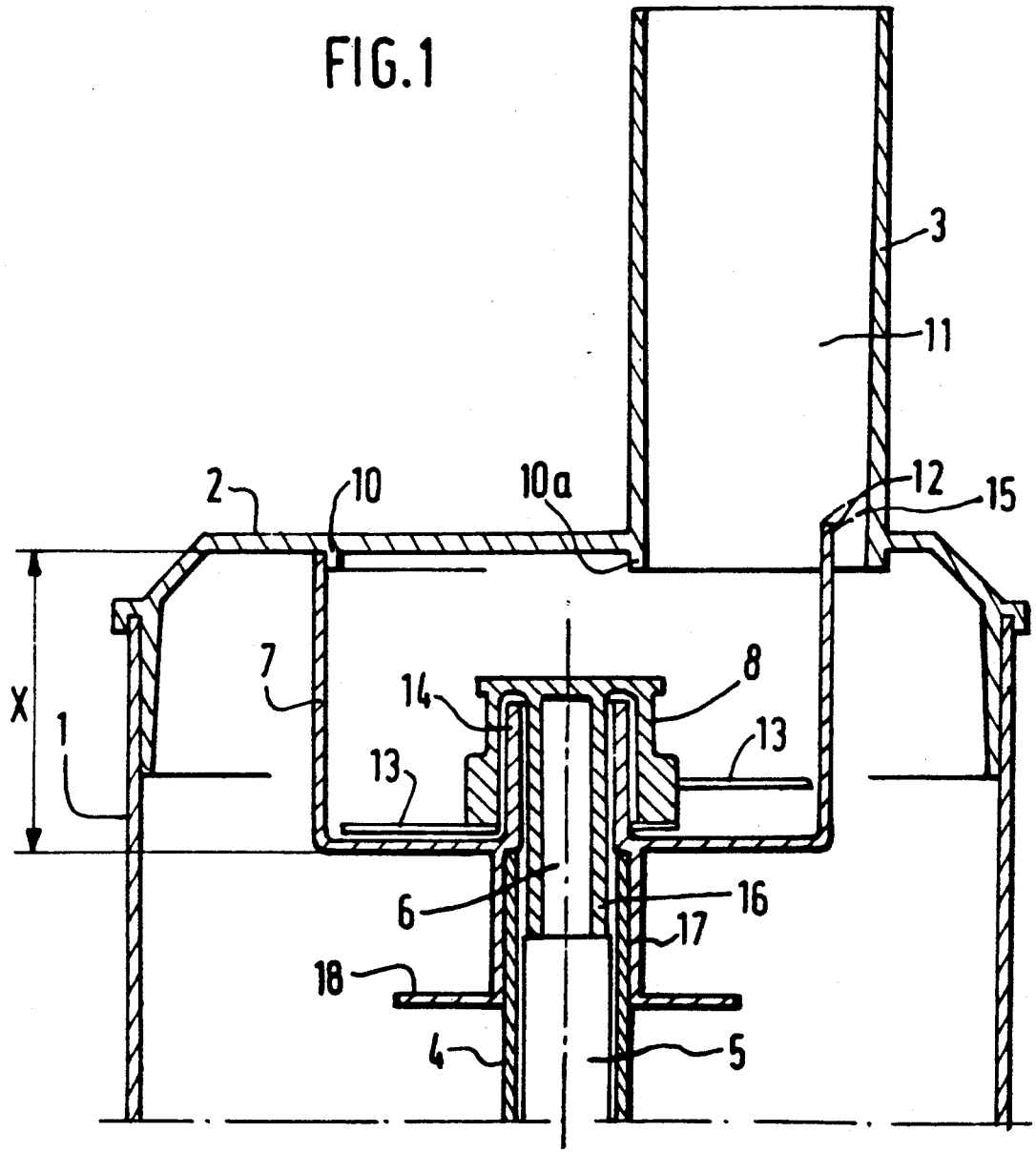
FIG. 1 is a vertical section view through a food processor fitted with an auxiliary bowl in accordance with the invention.

FIG. 1 shows the main bowl 1 of a food processor closed by a lid 2. In the example shown, the lid is provided with a food-insertion hopper 3. This figure which shows only the top portion of a food processor also shows the top end of the sleeve 4 surrounding the opening through the drive shaft 5 passes and preventing the liquid to be found inside the bowl from coming into contact with said drive shaft. The auxiliary bowl 7 is mounted on top of the sleeve 4. The bowl is generally cylindrical in shape and bears against the sleeve 4 by means of a skirt 17 which preferably terminates at its bottom end with a larger-diameter portion 18 serving as a stand. As before, the bowl 7 has a sleeve or baffle 14 for sealing the drive shaft. A tool 8 having two crescent-shaped knife blades 13 with their convex faces being forwardly directed (see FIG. 3) is shown inside the bowl 7. The knife 8 is provided with a hub or skirt 16 which is a friction fit over the end 6 of the drive shaft 5, which end has a section enabling it to drive the tool 8 without slipping.

In addition to bearing against the top end of the sleeve 4, the auxiliary bowl 7 also bears against the bottom surface of the lid 2 via a ring or projection 10. It is thus held by friction against any rotary drive which it could receive from the food being processed by rotation of the tool 8. The tool 8 serves to cut up and mix the food in the bowl 7. Other tools such as whisks for egg white could also be used.

The lid 2 is provided with a hopper or chute 3 defining an opening 11 into which food to be processed can be inserted while food is being processed.

The food may be conveyed towards the tool by means of a pusher (not shown) which slides inside the hopper, or if liquid, it may be inserted directly. When using a minibowl 7, it is advantageous to be able to use the hopper for adding ingredients such as oil or vinegar, for example, at precise moments.

Figure 3:
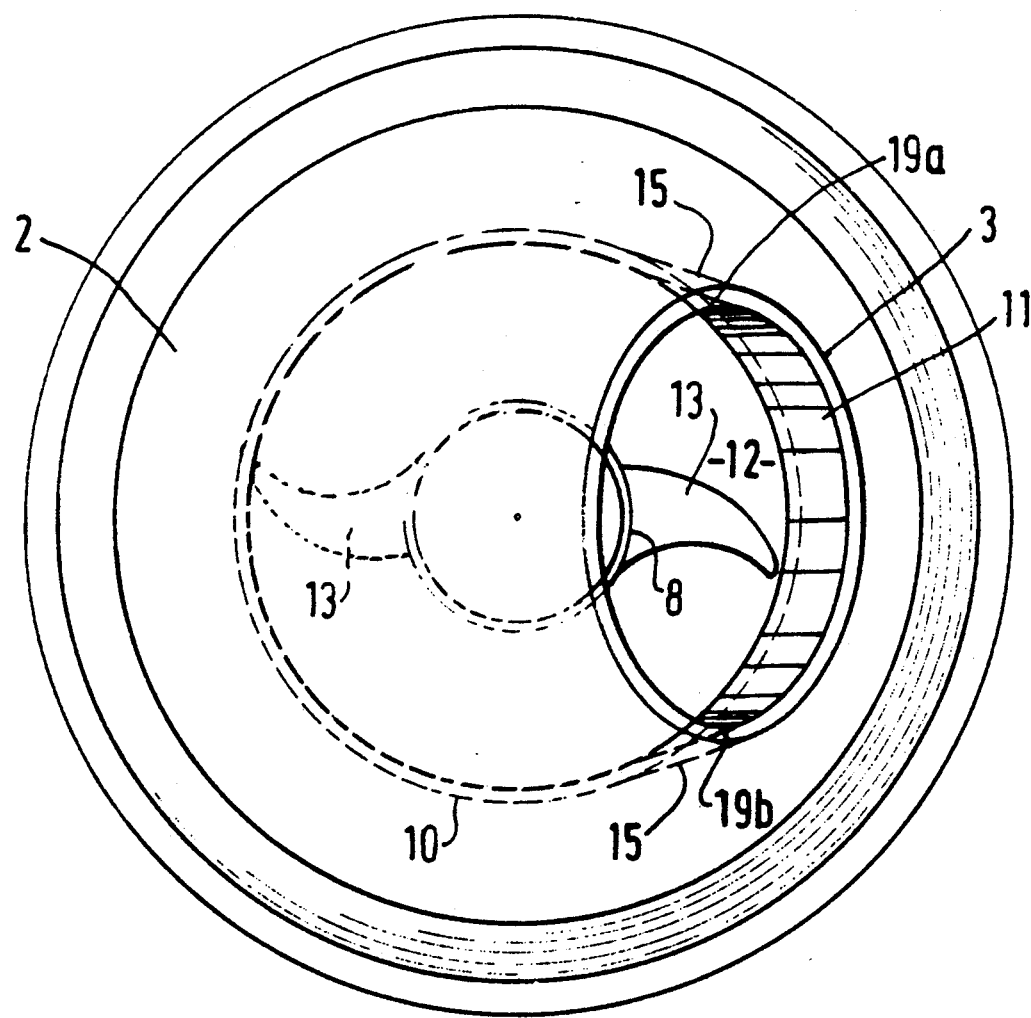
FIG. 3 is a plan view of the food processor in which an auxiliary bowl is mounted.

As can be seen in FIG. 3, the bowl 7 is provided with a rim 12 for projecting into the cavity 11 and holding the bowl 7 at points 19a and 19b. The auxiliary bowl 7 is thus securely prevented from rotating. Naturally, when the lid 2 is put into place on the bowl 1, and during the turning motion for locking the lid 2 on the bowl 1, the auxiliary bowl 7 is rotated through the same angle of rotation as the lid, which may be 90° for example.

The rim 12 is preferably provided with a collar 15 (shown in dashed lines in FIG. 1) whose end bears against the inside wall of the hopper 3. Thus, when adding liquid, adequate sealing is ensured, and no liquid falls into the main bowl 1.

Figure 2:
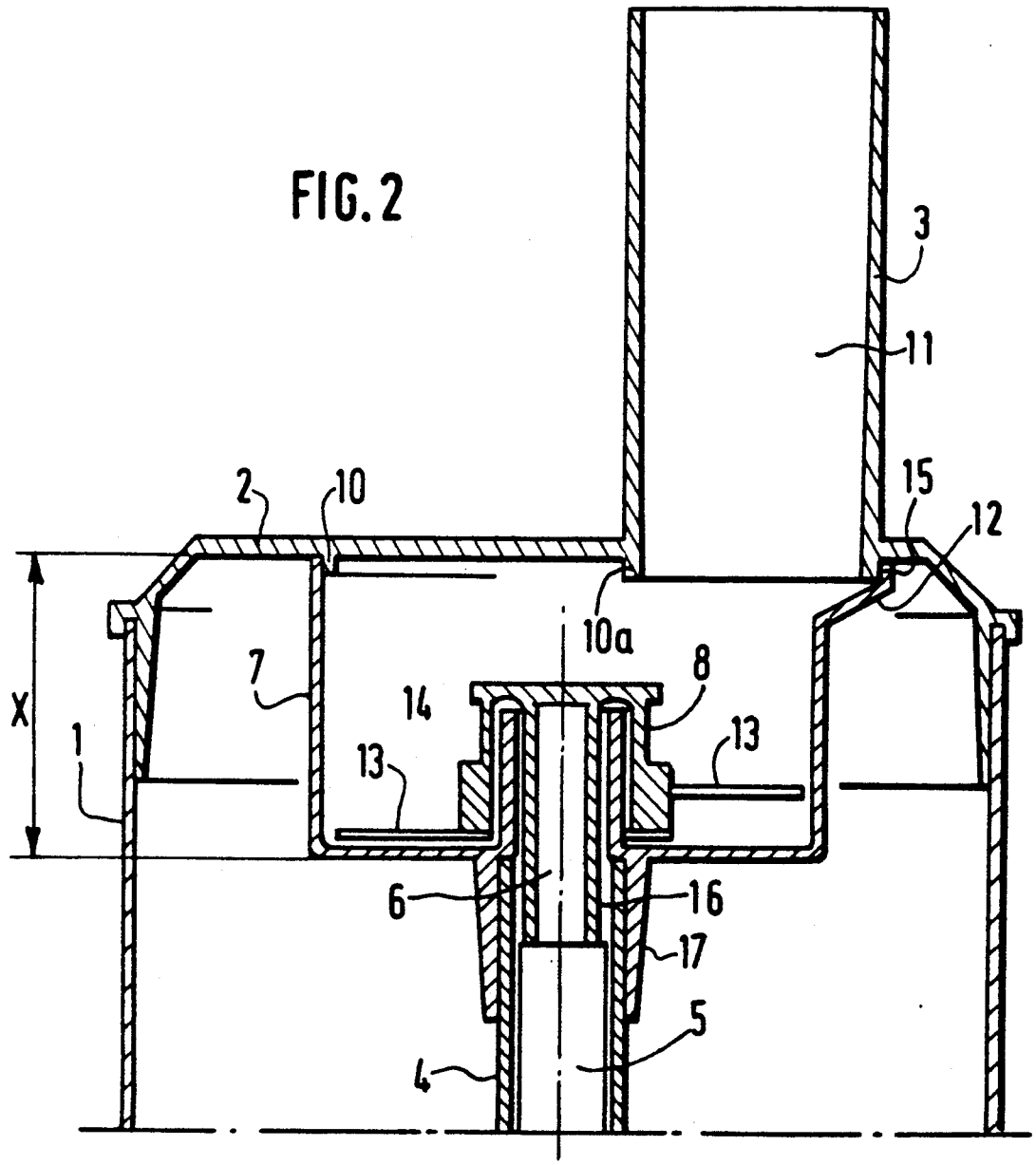
FIG. 2 shows another embodiment.
Figure 4:
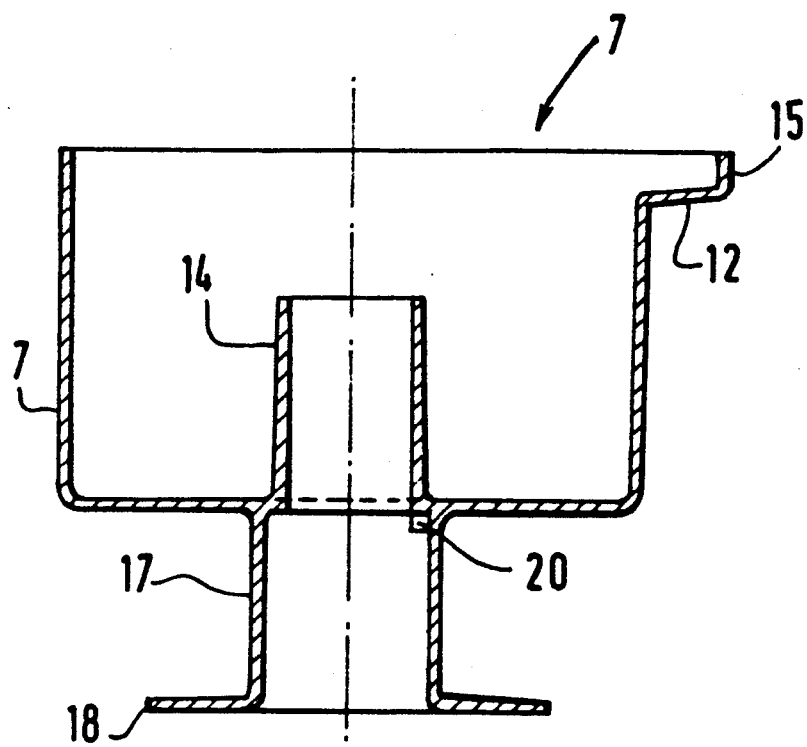
FIG. 4 is a vertical section view through the auxiliary bowl.
Figure 5:
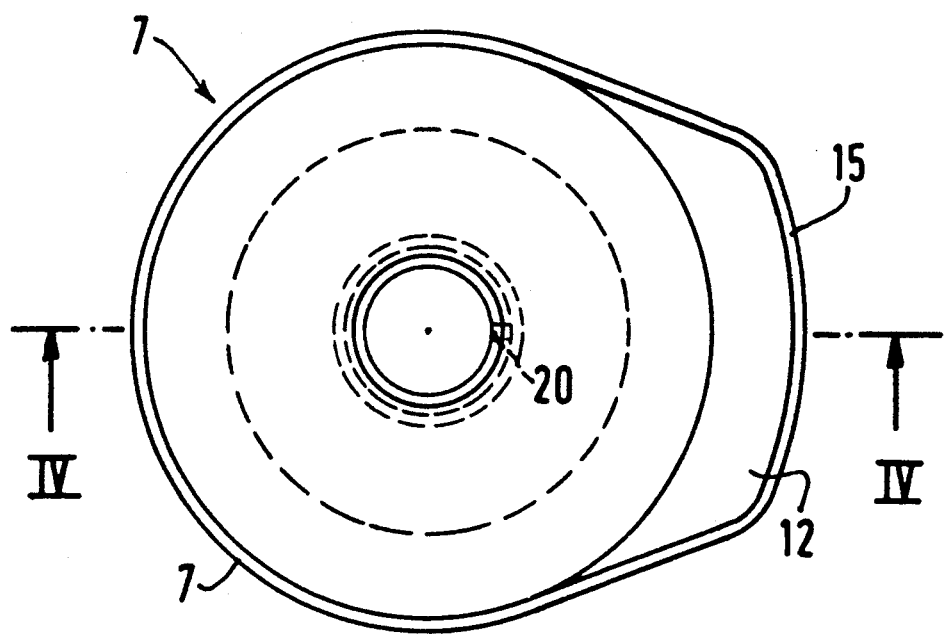
FIG. 5 is a plan view of the auxiliary bowl.

FIG. 2 shows a second embodiment which differs from the preceding embodiment only in that the auxiliary bowl or minibowl (shown in FIGS. 4 and 5) has a sloping edge 12 projecting from the minibowl and beneath the hopper 3. The edge 12 has a rim 15 which is folded upwards and which surrounds the lip 10a (projecting beneath the lid 2) of the hopper 3 going around the outside thereof. Thus, if food is inserted via the hopper 3, during processing, it slides naturally into the inside of the minibowl 7 and does not risk falling into the main bowl.

FIG. 3 is a plan view showing the respective positions of the hopper 3 and the minibowl, with the bottom edge 10a on the outside of the hopper being surrounded by the rim 15 in this embodiment. As before, the top edge of the minibowl bears against the ring 10 of the lid 2 and provides good sealing.

However, given that the auxiliary bowl is not circularly cylindrical by virtue of the edge 12 and the rim 15, it is naturally necessary for the bowl 7 to be accurately positioned relative to the hopper 3. This positioning is explained with reference to FIGS. 5, 6, and 7.

Figure 6:
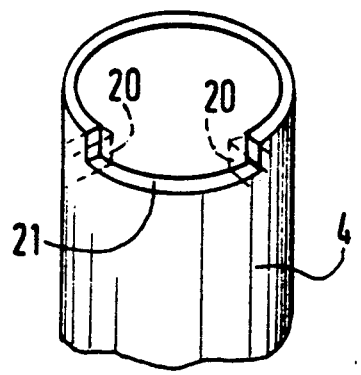
FIG. 6 is a detail view showing the top end of the sleeve of the main bowl.
Figure 7:
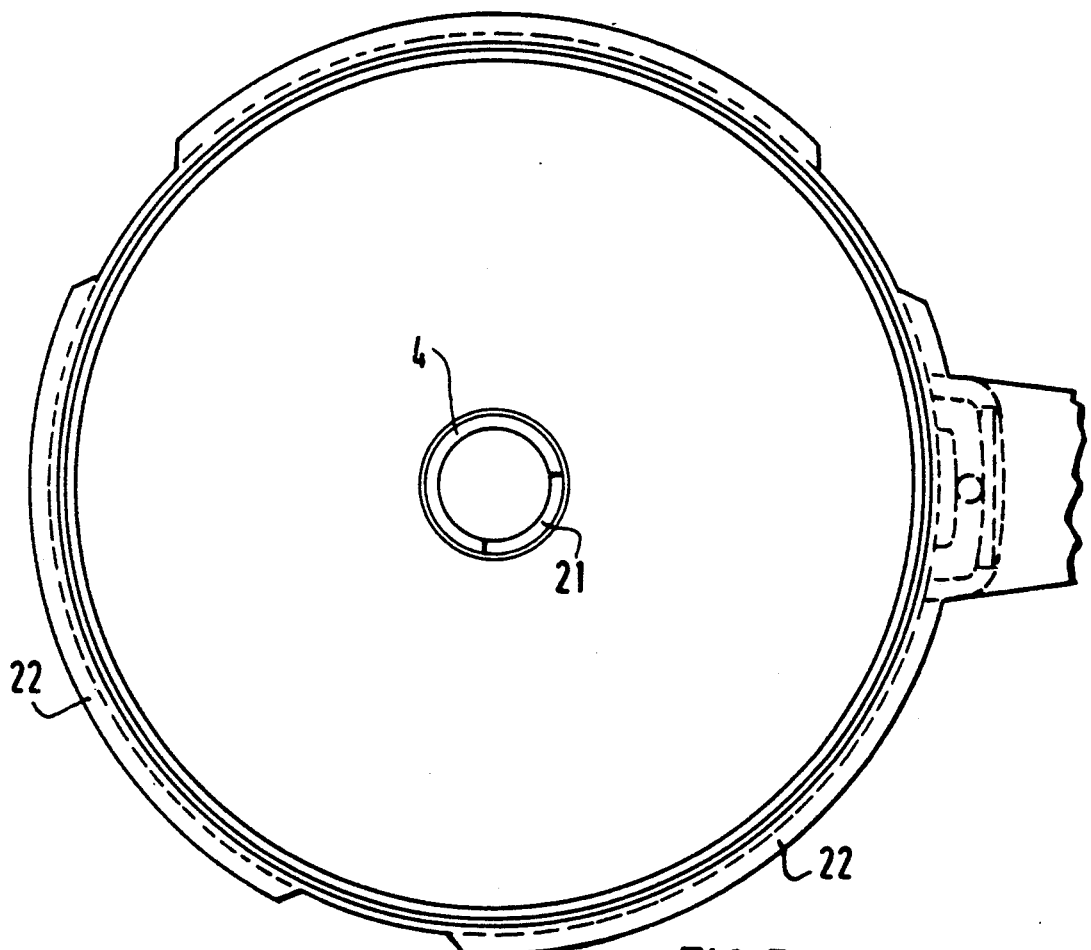
FIG. 7 is a plan view of the main bowl.

FIG. 6 shows the top end of the sleeve 4 having a notch 21. A peg 20 (visible in FIGS. 4 and 5) projecting from the minibowl 7 moves inside said notch and can come into abutment either with its lefthand end or else with the righthand end of the notch 21. These two positions correspond firstly to an assembly position and secondly to a locking position which is also the working position. The assembly position corresponds to notches formed in the rim 22 of the bowl 2, which notches allow the lid 2 to pass prior to its being locked on the bowl 1, with said locking being obtained by rotation through 90° for example. The motor can be switched on only once locking been obtained. In the assembly position (the position in which the various items are placed inside the bowl) with the peg 20 is in abutment against the lefthand surface of the notch 21, putting the lid 2 into place ensures that the hopper is suitably positioned relative to the auxiliary bowl, and that the hopper is surrounded by the rim 15 of the bowl 7. When the lid is locked, the auxiliary bowl is driven by and rotates with the hopper.

It is also possible to provide a slope on the notch 21 such that the minibowl placed on the sleeve 4 takes up the desired assembly position under gravity. By virtue of symmetry, two notches 21 may be formed in the top of the sleeve 4, said notches forming camming surfaces which serve both to position the auxiliary bowl automatically and to raise it when the lid is locked. Subsequent rotation of the lid raises the minibowl, thereby ensuring controlled contact between the top edge of the bowl 7 and the bottom surface of the lid 2 on the ring 10.

A set of different-diameter auxiliary bowls 7 can be used on a given appliance or even on an entire range of appliances, providing the dimension X indicating the difference in level between the top edge of the bowl 7 and the center of its bottom is kept constant.

Naturally, numerous variants may be implemented, in particular by substituting technically equivalent means, without thereby going beyond the scope of the invention.

I claim:

1. A food processor assembly comprising a base having a motor housed therein said motor driving a shaft which projects vertically from the base and which has a top surface, a main cylindrical bowl removably connected to the base, said main bowl being provided with a sleeve surrounding the drive shaft, and a lid having a top and bottom surface and being removably connected to said main bowl, said lid having an insertion hopper, and further comprising an auxiliary working bowl having a diameter less than the diameter of the main working bowl, said auxiliary working bowl being removably mounted on the sleeve of said main bowl, said auxiliary working bowl bearing against the bottom surface of said lid and said sleeve such that said auxiliary working bowl is stationary during operation of said assembly, said drive shaft being capable of driving a tool in said auxiliary working bowl.

2. A food processor according to claim 1 wherein the auxiliary working bowl is provided with a rim which penetrates into the opening in the hopper in said lid preventing said auxiliary bowl from rotating when said tool is rotated.

3. A food processor according to claim 2 wherein said rim provides a seal between the hopper and said auxiliary bowl.

4. A food processor assembly according to claim 3 wherein the rim of said auxiliary bowl has a top edge which is applied against the bottom of said lid by means of a sealing ring.

5. A food processor assembly according to claim 1 wherein the auxiliary working bowl is provided with a projecting edge having a rim surrounding the bottom of said hopper.

6. A food processor assembly according to claim 1 wherein a notch is formed in the upper edge of the sleeve in the main bowl wherein the lateral sides of said notch form abutments for at least one peg extending radially from the auxiliary bowl.

7. A food processor assembly according to claim 6 wherein said abutments correspond to an assembly position and to a locking position for both said auxiliary bowl and said lid.

8. A food processor assembly according to claim 6 wherein the notch of the sleeve of said main bowl is inclined relative to the horizontal such that said notch automatically positions said auxiliary bowl during assembly such that said auxiliary bowl becomes aligned with said hopper.

9. A food processor assembly according to claim 1 wherein said auxiliary bowl has a skirt in a bottom portion which constitutes a stand for said auxiliary bowl.

* * * * *